(12) United States Patent
Tomlinson

(10) Patent No.: US 8,790,450 B2
(45) Date of Patent: Jul. 29, 2014

(54) HUMIDITY SENSITIVE COMPOSITIONS

(75) Inventor: David John Tomlinson, Northbridge (AU)

(73) Assignee: VM3 International Pty Ltd (AU)

( * ) Notice: Subject to any disclaimer, the term of this patent is extended or adjusted under 35 U.S.C. 154(b) by 39 days.

(21) Appl. No.: 13/514,666

(22) PCT Filed: Dec. 13, 2010

(86) PCT No.: PCT/AU2010/001681
§ 371 (c)(1),
(2), (4) Date: Jun. 8, 2012

(87) PCT Pub. No.: WO2011/072326
PCT Pub. Date: Jun. 23, 2011

(65) Prior Publication Data
US 2012/0240765 A1    Sep. 27, 2012

(30) Foreign Application Priority Data

Dec. 14, 2009  (AU) .............................. 2009906066

(51) Int. Cl.
*B01D 53/02* (2006.01)

(52) U.S. Cl.
USPC ...... 96/108; 95/91; 95/117; 95/139; 252/194; 96/134

(58) Field of Classification Search
USPC ............................... 95/91, 117, 139; 252/194
See application file for complete search history.

(56) References Cited

U.S. PATENT DOCUMENTS

| | | | |
|---|---|---|---|
| 2,957,828 A | | 10/1960 | Mansfield |
| 6,004,477 A | * | 12/1999 | Nakagawa et al. ...... 252/188.28 |
| 6,693,148 B2 | | 2/2004 | Tomlinson et al. |
| 2006/0289827 A1 | * | 12/2006 | Stone ........................ 252/88.1 |

FOREIGN PATENT DOCUMENTS

| | | |
|---|---|---|
| CN | 1081398 A | 2/1994 |
| GB | 1312561 A | 4/1973 |
| WO | WO-0179341 A1 | 10/2001 |

\* cited by examiner

*Primary Examiner* — Christopher P Jones
(74) *Attorney, Agent, or Firm* — The Belles Group, P.C.

(57) ABSTRACT

A humidity sensitive composition which consists: a) of 5 to 50% by weight of a water and/or water vapor absorbing agent; b) 10 to 60% of a water vapor absorbing and releasing agent selected from perlite or vermiculite; c) 5 to 50% of an absorbent for small molecules. Is used as the basis for controlling container rain, sequestering carbon dioxide, and removing ozone and hydrogen sulfide from the air.

4 Claims, No Drawings

HUMIDITY SENSITIVE COMPOSITIONS

PRIORITY

Priority is claimed as a national stage application, under 35 U.S.C. §371, to PCT/AU2010/001681, filed Dec. 13, 2010, which claims priority to Australian application 2009906066, filed Dec. 14, 2009. The disclosures of the aforementioned priority applications are incorporated herein by reference in their entirety.

This invention relates to the use of a humidity sensitive composition to address a number of vapour and gaseous phase problems.

BACKGROUND TO THE INVENTION

A humidity sensitive composition is disclosed in U.S. Pat. No. 6,693,148 which includes perlite or vermiculite in combination with a zeolite and a super absorbent polymer. The composition is usually contained in pads, mats or filters and adsorb and absorb water and increase in mass when $\delta a_w$ (air-device) are positive and desorb water, decreasing mass, when $\delta a_w$ (air-device) are negative.

Humidity causes problems in the transportation of goods in containers. In the transportation of fabrics water staining can occur due to the formation of water inside the containers including the problem of "container rain".

The humidity sensitive compositions also release water vapour and this can be used to carry and disperse microbiostatic or microbiocidal agents. The rate of release is however difficult to control.

The extraction of small gaseous molecules and there storage is of current concern. These include but are not limited to alkanes (ethane, propane and butane), the latter two of which are combusted to provide heat, chlorofluorocarbons (CFC's), which are refrigeration gases, $CO_2$, the product of combustion of carbon sources (e.g. wood, oil and coal), or of aerobic respiration and anaerobic fermentation, methane or marsh gas, the principal carbon product of anoxic (anaerobic) microbial growth and proliferation, methyl bromide and carbon disulfide used as fumigants, particularly of grains. Other gases can be consistently grouped as "hydrides" e.g. $H_2S$, hydrogen sulfide (rotten egg gas), $PH_3$, phosphine; HCN, hydrogen cyanide, which are toxic and poisonous; and "oxides", e.g. oxygen ($O_2$), ozone ($O_3$), carbon monoxide (CO), carbon dioxide ($CO_2$) and nitrogen dioxide ($NO_2$). The last three of these plus methane and the CFC's are the greenhouse gases which have been implicated in global warming.

Control of some gases of low molecular weight is required in food preservation and quality retention. Ethylene is a gas which is produced in nearly all climacteric tropical fruits as an endogenous ripening agent. Carbon dioxide ($CO_2$), the product of aerobic respiration, is an effector of quality in pomes (apples, pears, etc.), fruits which are stored under refrigeration for up to now 12 months. Modified roots and tubers with high respiration rates (i.e. release of $CO_2$—e.g. carrots, sweet potatoes, turnips, parsnips, swedes etc.) require special absorbent packaging is used. Sulphur dioxide ($SO_2$), which is a preservative in a range of food products where it is permitted, e.g. in fruits both fresh and dried, is also used.

It is an object of this invention to address these problems.

BRIEF DESCRIPTION OF THE INVENTION

In a first aspect this invention provides a composition for ameliorating the effects of condensation of water in closed containers by using a dessicant in combination with a humidity sensitive composition which consists a) of 5 to 50% by weight of a water and/or water vapour absorbing agent b) 10 to 60% of a water vapour absorbing and releasing agent selected from perlite or vermiculite c) 5 to 50% of an absorbent for small molecules and the dessicant is present in an amount of from 25 to 50% by weight of the humidity sensitive composition.

The preferred water and or water vapour absorbing agent is a superabsorbent polymer (SAP) as disclosed in U.S. Pat. No. 6,699,3148.

The desiccant may be selected from calcium chloride (which is a hygroscopic and deliquescent), phosphorous pentoxide and silica gel which are hygroscopic A preferred dessicant is anhydrous calcium chloride.

The compositions may also contain , microbiostatic (i.e. stop the growth of microbial species) and or microbiocidal (affecting complete microbial death) agents . In another aspect the rate of release of microbiostatic and microbiocidal agents can be controlled by adding the microbiostatic and microbiocidal agents to a humidity sensitive composition which consists a) of 5 to 50% by weight of a water and/or water vapour absorbing agent b) 10 to 60% of a water vapour absorbing and releasing agent selected from perlite or vermiculite c) 5 to 50% of an absorbent for small molecules and at least 20% by weight of component a) of a hydrophobic polymer.

The hydrophobic polymer may be selected from octyl- or phenyl-starch, lipophilic Sephadex ($\propto 1 \rightarrow 6$ dextran that had been hydroxypropylated) or $C_8$ or $C_{18}$ silica (used as HPLC chromatographic matrices). These reduce the rate of release of water (as vapour) from devices incorporating the composition of this invention. As an alternative to the hydrophobic polymer this invention provides surface modification of the mineral earth with cetyl trimethyl ammonium chloride (SMZ).

Hydrogen sulfide is a noxious, very poisonous, malodorous gas generated under anoxic conditions by bacterial fermentation in sewers and particularly STPs as well as under covers or vents to atmosphere in landfill sites.

Under normal operating conditions venting stacks have close to water saturated air which is the medium carrying the $H_2S$ gas molecules.

In a further aspect of this invention there is provided a composition for controlling vapour phase reducing agents such as hydrogen sulphide which consists of a) of 5 to 50% by weight of a water and/or water vapour absorbing agent b) 10 to 60% of a water vapour absorbing and releasing agent selected from perlite or vermiculite c) 5 to 50% of an absorbent for small molecules and a chemical oxidant in solid or liquid form.

The oxidant is preferably hypochlorite, perchlorate or any other source of chlorine or any other strong oxidant such as trichlorocyanuric acid, potassium permanganate, or potassium dichromate. The composition is added to air filters and is highly efficient in the treatment of $H_2S$ in rising sewer mains and venting stacks in sewerage treatment plants (STPs). The reaction product is sulfate ion which is water soluble.

The efficacy of the process is indicated by the fact that the human nose has a very low threshold for detection of $H_2S$ and active chemical filters of the invention can remove ≥99.99% of the $H_2S$ as measured by electronic ("nose") monitors. (People can still smell $H_2S$ when the reduction is 5 $\log_{10}$).

By comparison filters that contain mineral earth alone and the oxidising chemical remove ≥99.9% of the $H_2S$, thus an order of magnitude less than the composition of this invention.

Other vented stacks releasing (other) malodourous volatiles e.g. as are used in food processing and cooking in general do not have water-saturated air, in which case addition of an hygroscopic chemical or more preferably one which is deliquescent, e.g. anhydrous calcium chloride, at 10-50% of the solids content has been found to be effective in malodour control in several different situations. In like manner hydrogen cyanide (HCN) and phosphine ($PH_3$), the former a deadly poisonous gas, which completely inhibits respiration and the latter, a poisonous and potentially lethal gas, which is used as a grain protectant and to kill rabbits in warrens below ground could be treated chemically and oxidised to non-toxic products.

Green House Gas Removal

In a further aspect this invention provides a method of sequestering Carbon dioxide which involves passing the carbon dioxide gas over a composition containing calcium oxide, calcium hydroxide and/or anhydrous calcium chloride in combination with a humidity sensitive composition which consists
 a) of 5 to 50% by weight of a water and/or water vapour absorbing agent
 b) 10 to 60% of a water vapour absorbing and releasing agent selected from perlite or vermiculite
 c) 5 to 50% of an absorbent for small molecules.

This invention is partly predicated on the observation from trials on food transport packages which contained the hygroscopic and deliquescent chemical, anhydrous calcium chloride. Analysis, has shown that, with time, and when the calcium chloride dissolved, a fine white powder was deposited in the, now wet, composition. Analysis of this material showed this to be calcium carbonate ($Ca^{2+}+H_2O+CO_{2(g)} \rightarrow CaCO_3 \downarrow 2H^+$).

Reducing the quantum of greenhouse gas emissions and payments for carbon offsets (carbon credits) are, an approach to reducing global warming.

Formulations of this invention containing a suspension of slaked lime (calcium oxide—CaO and calcium hydroxide —$Ca(OH)_2$) now often referred to as "lime milk" were trialled at bench top scale. This composition was effective in sequestering carbon dioxide in water-saturated air and reacting it to the carbonate, but less so relying only on humidity sensitivity when the $a_w$ was lower.

In another aspect this invention provides a composition for controlling vapour phase oxidizing agents which consists
 a) of 5 to 50% by weight of a water and/or water vapour absorbing agent
 b) 10 to 60% of a water vapour absorbing and releasing agent selected from perlite or vermiculite
 c) 5 to 50% of an absorbent for small molecules and a chemical reducing agent in solid or liquid form.

Compositions of this invention with an added reducing agent are useful in removing ozone. Ozone is a highly reactive gas (potentially dangerous to people) and a strong oxidant found commonly in railway tunnels formed by electrical arcing, or as a consequence of lightning strikes above ground.

This composition is also adaptable to use in controlling carbon monoxide and nitrogen oxides.

The compositions of this invention can be presented in a number of packaging formats as explained in U.S. Pat. No. 6,93,148. Pads and sachets with one or more porous faces are useful in air filter locations or confined spaces. These can be used as an array or singly. By adding additional water the composition may be presented as a gel or as a liquid solid in water sol. The perlite disproportionate to the surface and the other solids dissolve (the polymer) or are held in suspension (zeolite). It is important in dealing with gases or vapour phase applications that the pressure drop across the composition is low so that treated gases can be exhausted to the atmosphere at airflow rates less than 1 $m^3$/minute to above 2000 $m^3$/minute.

The composition may also be formed into pellets by extrusion. The pellet sizes may be 3-12 mm and be contained in metal or synthetic plastic containers that are non reactive in the environment in which they are placed. Inert coatings such as epoxy polymers, Teflon, or stainless steel or galvanised surfaces. Expanded pellets may be formed using a starch based binder extruded at higher temperatures and pressure. The increased surface area makes the pellets more effective. The pellets are also suitable for use with liquid reactants.

Instead of starch styrene or PVA may also be used.

Activated carbon may additionally be added to collect gases and compounds with a molecular mass above 200 daltons. Activated Alumina is also useful as a particle component with high surface area.

Alternatively and/or in addition surface modification of the mineral earth in the humidity sensitive composition by cetyl trimethyl ammonium chloride binds anions like nitrate ion (NO3) in the same way that the natural mineral earth binds cations.

DETAILED DESCRIPTION OF THE INVENTION

The condensation controlling compositions are effective in protection from mould growth on goods made from natural fibres, wool, cotton, and leather packed in plastic bags, as would be the case in normal bulk transportation (bags inside boxes in containers). Addition of anhydrous calcium chloride at 25-50% of mass in solids to the formulation in sachet pads was found to be effective in the removal of water staining in containers, while mould growth was still inhibited.

EXAMPLE 1

Table 1 sets out suitable compositions in parts by weight for preventing condensation in containers or controlling mould growth in humid environments.

TABLE 1

| Improving Functionality. | | |
|---|---|---|
| Application Component | A) Condensation | B) Mould Control Leather/Fabrics |
| a | 10 | 10 |
| b | 40 | 40 |
| c | 50 | 50 |
| Emulsion 1/50 | | 60 |
| $CaCl_2$ | 30 | 30 |
| Total | 130 | 190 |

EXAMPLE 2

Preferred release rate controlling compositions are set out in table 2.

TABLE 2

Affecting Control and Delivery of Volatiles.

| Component | A | B |
|---|---|---|
| a | 10 | 10 |
| b | 40 | 40 |
| c | 50 | 25 |
| Emulsion 1/50 | 60 | 60 |
| Octyl starch | 5 | |
| SMZ | | 25 |
| Total | 165 | 160 |

Cetyl trimethyl ammonium chloride(SMZ) was equally as effective as the addition of a hydrophobic polymer at the same molar content in reducing the rate of release of water.

EXAMPLE 3

It has been found that the humidity sensitive compositions can be combined with a sulphur dioxide releasing agent such as sodium metabisulfite is useful in controlling fungal growth in packaged grapes and berries.

It is usual with sulphur dioxide releasing compositions that there is an initial spike in the release which can be harmful to the fruit. Addition of hygroscopic and deliquescent chemical, anhydrous calcium chloride, (which competes with the SAP for water and thus reduces $a_w$ i.e. free water), at 10-50% of the total solids mass reduced the spike of $SO_2$ proportionally compared to controls (i.e. without anhydrous calcium chloride) as described. Alternatively the addition of a hydrophobic polymer, (as described before at 50% of the SAP content), damped down the release of $SO_2$ as judged by the retention of fruit colour.

Combinations of hygroscopic (and deliquescent) anhydrous calcium chloride and a hydrophobic polymet: affected the initial rate of efflux of $SO_2$ gas.

Table 3 sets out the formulations used with a sulphur dioxide generator.

TABLE 3

Affecting gas ($So_2$) release from chemical reaction in situ.

| Component | A | B | C | D |
|---|---|---|---|---|
| a | 10 | 10 | 10 | 10 |
| b | 40 | 40 | 40 | 40 |
| c | 50 | 50 | 25 | 25 |
| Pure water | 10 | 10 | 10 | 10 |
| CaCl$_2$ | 30 | 30 | 30 | 30 |
| Octyl Starch | | 5 | 5 | |
| SMZ | | | | 25 |
| NaMBS | 3 | 3 | 3 | 3 |
| Total | 143 | 148 | 123 | 143 |

Surface modification of the mineral earth with cetyl trimethyl ammonium chloride was equally effective as a negative effector of efflux of $SO_2$ as was the addition of an hydrophobic polymer. This confirms the close physical attraction and interaction of the mineral earth (zeolite) and the SAP.

EXAMPLE 4

Compositions for controlling vapour phase reducing agents like hydrogen sulphide, malodorous volatiles and poisonous gases are set out in table 4.

TABLE 4

Affecting Entrapment of Gases and Volatiles and Reaction in situ

| | Gas/Volatile Component | | |
|---|---|---|---|
| | A) $H_2S$ | B) Other Malodorous Volatiles | C) Poisonous Gases HCN or $PH_3$ |
| a | 10 | 10 | 10 |
| b | 40 | 40 | 40 |
| c | 50 | 50 | 50 |
| CaCl$_2$ | | 30 | 30 |
| TCCA | 15 | 15 | 15 |
| Lime Milk | | | |
| Total | 115 | 145 | 145 |

The efficacy of the process is indicated by the fact that the human nose has a very low threshold for detection of $H_2S$ and active chemical filters of the invention can remove ≥a99.99% of the $H_2S$ as measured by electronic ("nose") monitors. (People can still smell $H_2S$ when the reduction is 5 $\log_{10}$).

By comparison filters that contain mineral earth alone and the oxidising chemical remove ≥299.9% of the $H_2S$, thus an order of magnitude less than the composition of this invention.

Other vented stacks releasing (other) malodourous volatiles e.g. as are used in food processing and cooking in general do not have water-saturated air, in which case addition of an hygroscopic chemical or more preferably one which is deliquescent, e.g. anhydrous calcium chloride, at 10-50% of the solids content has been found to be effective in malodour control in several different situations. In like manner hydrogen cyanide (HCN) and phosphine ($PH_3$), the former a deadly poisonous gas, which completely inhibits respiration and the latter, a poisonous and is potentially lethal gas, which is used as a grain protectant and to kill rabbits in warrens below ground could be treated chemically and oxidised to non-toxic products.

EXAMPLE 5

Green house gas sequestration can be achieved using the preferred composition set out in table 5.

TABLE 5

Affecting Entrapment of Gases and Volatiles and Reaction in situ

| | Gas/Volatile Component Greenhouse Gases $CO_2$ | | |
|---|---|---|---|
| | D) | E) | F) |
| a | 10 | 10 | 10 |
| b | 30 | 30 | 30 |
| c | 60 | 60 | 60 |
| CaCl$_2$ | 12.5 | | 12.5 |
| TCCA | | | |
| Lime Milk | | 25 | 25 |
| Total | 112.5 | 125 | 137.5 |

Addition of anhydrous calcium chloride at 10-15% of solids mass did improve the amount of carbon dioxide reacted (as measured by an infra-red gas analyser-IRGA) and calcium carbonate deposited (as measured gravimetrically). At higher levels of this desiccant, the solubility of the lime milk was significantly reduced. In coal fired electricity generation carbon dioxide is released into a stream of hot water vapour (i.e. steam) which is an ideal carrier for $CO_2$ sequestration.

EXAMPLE 6

Compositions that are preferred for use in controlling vapour phase oxidising agents are set out in table 6.

TABLE 6

Affecting Entrapment of oxidizing Gases and Volatiles and Reaction in situ

| | Gas/Volatile Component | | | | |
|---|---|---|---|---|---|
| | Ozone | | Carbon Monoxide Nitrogen Dioxide | Nitrogen Dioxide | |
| | A) | B) | C) | D) | E) |
| a | 10 | 10 | 10 | 10 | 10 |
| b | 60 | 60 | 60 | 60 | 60 |
| c | 30 | 30 | 30 | 30 | 15 |
| Emulsion 1/50 | 60 | | | | |
| $CaCl_2$ | | 30 | | 30 | 30 |
| SMZ | | | | | 15 |
| TCCA | | | 15 | 15 | 15 |
| NaDT | | 20 | | | |
| Total | 160 | 150 | 115 | 145 | 145 |

The humidity sensitive composition has been shown to physically bind to and react is with ozone as, for example, in railway tunnels for electric trains.

The humidity sensitive composition containing a proprietary oil in water emulsion also physically removes ozone from the air, but their capacity is very limited. Ozone reacts very strongly with any reducing agent (e.g. sodium dithionite, etc.) to produce oxygen and then water.

The humidity sensitive composition containing the hygroscopic and deliquescent chemical anhydrous calcium chloride at 10-25% of the total solids content and a reducing chemical including but not limited to sodium dithionite also at 10-25% of the total solids mass was effective in chemically reacting ozone from an ozone generator or in an enclosed room in an underground railway station.

Carbon monoxide and nitrogen dioxide both can be further oxidised by any strong chemical oxidant, including but not limited to sources of free chlorine, to make carbon dioxide and nitrate ($NO_3^-$) ions. The former can then be treated as already discussed and the latter, being soluble, can dissolve in the free water within the device.

Addition of anhydrous calcium chloride from 10-25% of total solids mass to humidity sensitive compositions in filter devices provides a quantifiable improvement in the case of nitrogen dioxide.

Those skilled in the art will appreciate that the present invention provides a cost effective solution to the problems of controlling container rain, sequestering carbon dioxide, and removing ozone and hydrogen sulfide from the air. Those skileed in the art will also realise that this invention can be implemented in embodiments other than those described without departing from the core teachings of this invention.

The invention claimed is:

1. A composition to controlling the condensation of water in closed containers, the composition comprising a desiccant selected from calcium chloride, phosphorous pentoxide and silica gel in combination with a humidity sensitive composition, the humidity sensitive composition comprising:
   a) 5 to 50% by weight of a water absorbent polymer;
   b) 10 to 60% of a water vapour absorbing and releasing agent selected from perlite or vermiculite; and
   c) 5 to 50% of an absorbent for small molecules, wherein the absorbent for small molecules is different from the water vapour absorbing and releasing agent;
   wherein the desiccant is present in an amount of from 25 to 50% by weight of the humidity sensitive composition.

2. A method of sequestering carbon dioxide comprising passing carbon dioxide gas over a composition containing calcium oxide, calcium hydroxide and/or anhydrous calcium chloride in combination with a humidity sensitive composition, the humidity sensitive composition comprising:
   a) 5 to 50% by weight of a water absorbent polymer;
   b) 10 to 60% of a water vapour absorbing and releasing agent selected from perlite or vermiculite; and
   c) 5 to 50% of an absorbent for small molecules, wherein the absorbent for small molecules is different from the water vapour absorbing and releasing agent.

3. A composition for controlling vapour phase reducing agents, the composition comprising:
   a) 5 to 50% by weight of a water absorbent polymer;
   b) 10 to 60% of a water vapour absorbing and releasing agent selected from perlite or vermiculite;
   c) 5 to 50% of an absorbent for small molecules, wherein the absorbent for small molecules is different from the water vapour absorbing and releasing agent; and
   a chemical oxidant selected from a source of chlorine, trichlorocyanuric acid, potassium permanganate, or potassium dichromate in solid or liquid form.

4. The composition of claim 3, wherein the source of chlorine is selected from hypochlorite and perchlorate.

* * * * *